United States Patent [19]

Thew

[11] Patent Number: 5,032,275

[45] Date of Patent: Jul. 16, 1991

[54] CYCLONE SEPARATOR

[75] Inventor: Martin T. Thew, Southampton, United Kingdom

[73] Assignee: Conoco Specialty Products Inc., Houston, Tex.

[21] Appl. No.: 377,848

[22] PCT Filed: Nov. 20, 1987

[86] PCT No.: PCT/AU87/00402

§ 371 Date: Jul. 18, 1989

§ 102(e) Date: Jul. 18, 1989

[87] PCT Pub. No.: WO88/03841

PCT Pub. Date: Jun. 2, 1988

[30] Foreign Application Priority Data

Nov. 21, 1986 [GB] United Kingdom ................. 8627960

Apr. 21, 1987 [GB] United Kingdom ................. 8709438

[51] Int. Cl.[5] ............................................ B01D 17/038

[52] U.S. Cl. .................................. 210/512.1; 210/788

[58] Field of Search ............................ 210/512.1, 788; 209/144, 211

[56] References Cited

U.S. PATENT DOCUMENTS 4,576,724 3/1986 Colman et al. .............. 210/512.1 X 4,722,796 2/1988 Colman et al. ................... 210/512.1

4,820,414 4/1989 Carroll et al. .................... 210/512.1

Primary Examiner—Charles Hart

Attorney, Agent, or Firm—John E. Holder

[57] ABSTRACT

A cyclone separator comprising at least a primary portion having generally the form of a volume of revolution and having a first end and a second end, the diameter at said second end being less than at said first end, at least one inlet, the or each said inlet having at least a tangential component at or adjacent said first end for introducing feed to be separated into the cyclone separator, and the separator further including at least two outlets, one at each end of the primary portion, in which cyclone separator the following parameters are related according to a specified set of design and operating conditions as defined in claim 1: (i) diameter of the primary portion where flow enters, $d_1$: (ii) projection of the cross sectional area of $x^{th}$ inlet, Aix; (iii) diameter of the primary portion at point $Z_2$, $d_2$; (iv) distance along the cyclone separator axis from the inlet, Z; (v) diameter of the cyclone at Z, d, (vi) axial position of the $x^{th}$ inlet, $Z_x$: (vii) half angle of convergence of the separation section, $\alpha$, (viii) position of the second end of the primary portion, $d_3$: (ix) diameter of the outlet at the first end of the primary portion, $d_o$.

17 Claims, 2 Drawing Sheets

CYCLONE SEPARATOR

Figure 1:
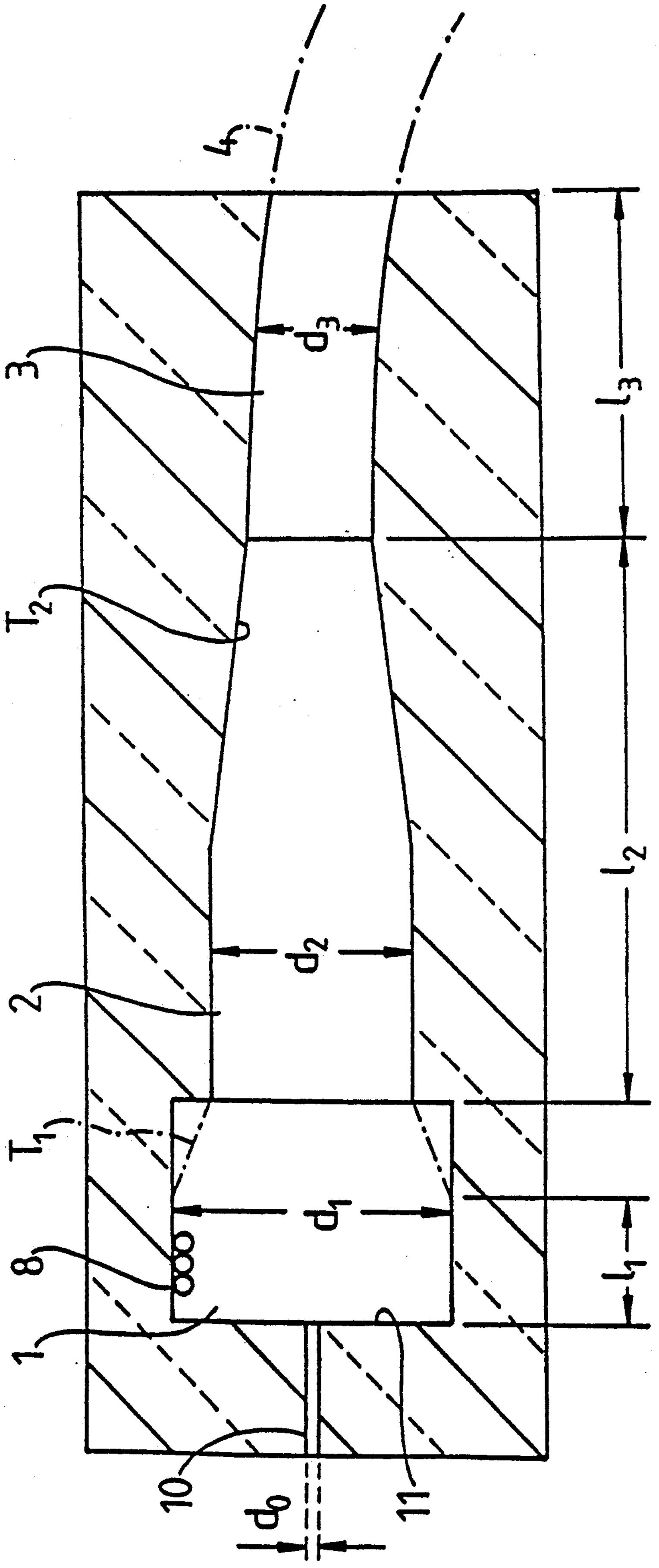

This invention relates to a cyclone separator. This separator may find application in removing a lighter phase from a large volume of denser phase such as oil from water, with minimum contamination of the more voluminous phase. Most conventional cyclone separators are designed for the opposite purpose, that is removing a denser phase from a large volume of lighter phase, with minimum contamination of the less voluminous phase. In our case, a typical starting liquid-liquid dispersion would contain under 1% by volume of the lighter (less dense) phase, but it could be more.

This invention is based on the observation that when the density difference is small or the droplets of the lighter phase are small (generally less than 25 μm) more efficient separation can be achieved if there is a restriction to flow through the cyclone a longway downstream of the cyclone.

According to the present invention there is provided a cyclone separator comprising at least a primary portion having generally the form of a volume of revolution and having a first end and a second end, the diameter at said second end being less than at said first end, at least one inlet, the or each said inlet having at least a tangential component, at or adjacent said first end for introducing feed to be separated into the cyclone separator and the separator further including at least two outlets, one at each end of the primary portion in which cyclone separator the following relationships apply:

where $d_1$ is the diameter of the said primary portion where flow enters, preferably in an inlet portion at said first end of said primary portion, (but neglecting any feed channel) $d_{ix}$ is twice the radius at which flow enters the cyclone through the $x^{th}$ inlet (i.e. twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where $$A_i = \sum_{x=1}^{x=n} A_{ix}$$

and where $d_2$ is the diameter of the primary portion measured at a point $z_2$ where the condition first applies that $$\tan^{-1} \frac{d_2 - d}{2(z - z_2)} < 2^o$$

for all $z > z_2$ where z is the distance along the cyclone separator axis downstream of the plane containing the inlet and d is the diameter of the cyclone at z, and further z=0 being the axial position of the weighted areas of the inlets such that the injection of angular momentum into the cyclone separator is equally distributed axially about said axial position where z=0 and being defined by $$\frac{1}{A_i d_i} \sum_{x=1}^{x=n} z_x A_{ix} d_{ix} = 0$$

where $z_x$ is the axial position of the $x^{th}$ inlet.

Moreover in the separator of the invention, the second end of the primary portion feeds into a second portion of constant diameter $d_3$ and length $l_3$ and the following further relationships apply:

$$3 < \pi \frac{d_2\, d_i}{4A_i} < 20 \qquad \text{(i)}$$

$$20' < \alpha < 2^o \qquad \text{(ii)}$$

where α is the half angle of the convergence of the separation portion i.e.

$$\alpha = \tan^{-1} \frac{d_2 - d_3}{2(z_3 - z_2)},$$

where $d_3$ is the diameter of the second end of the primary portion, at position $z_3$ $$d_o/d_2 < 0.2, \text{ where } d_o \text{ is the diameter of the outlet at the first end of the primary portion} \qquad \text{(iii)}$$

$$0.9 d_1 > d_2 \text{(iv)}$$

$$0.9 d_2 > d_3 \qquad \text{(v)}$$

$$l_3/d_2 > 22 \qquad \text{(vi)}$$

The inlet or inlets may be directed tangentially into the primary portion or into an inlet portion or may have an inwardly spiralling feed channel, such as an involute entry. Preferably, where the inlet(s) are directed tangentially there are at least two equally circumferentially spaced inlets.

A plurality of inlets may be axially staggered along the primary portion or an inlet portion. Moreover the inlet or inlets need not be arranged to feed exactly radially into the separator but may have an axial component to their feed direction.

Each feed channel may be fed from a duct directed substantially tangentially into the inlet portion, the outer surface of the channel converging to the principal diameter of the inlet portion $d_1$, for example by substantially equal radial decrements per unit angle around the axis, preferably attaining the diameter $d_1$ after at least 360° around the axis.

The expression $$\frac{\pi d_2 d_i}{4A_i}$$

which we call the "swirl coefficient" S, is a reasonable predictor of the ratio of velocities tangentially: axially of flow which has entered the cyclone and which has reached the plane $d_2$.

With a dispersed lighter phase, as is of interest to us, in order to be able to create an internal flow structure favourable for separation at a low split ratio $$\text{i.e. split ratio} = \frac{\text{(flow through overflow outlet)}}{\text{(total flow through inlets)}}$$

of the order of 1%, the overflow outlet being an outlet at the first end of the primary portion, then the half-angle of convergence averaged over the whole primary portion is 20′ to 2°, preferably not more than 1°, more preferably less than 52′ preferably at least 30′. S is from 3 to 20, preferably from 4 to 12 and more preferably from 6 to 10.

The convergence averaged from the diameter $d_1$ measured in the inlet plane to the diameter $d_2$ may be the fastest (largest cone half-angle) in the cyclone, and may be from 5° to 45°. (The inlet plane is that plane normal to the cyclone axis including the point $z=0$.)

The inlet portion should be such that the angular momentum of material entering from the inlets is substantially conserved into the primary portion.

When the separator includes an inlet portion of length $l_1$ then $l_1/d_1$ may be from 0.5 to 5, preferably from 1 to 4.

Preferably, $d_3/d_2$ is less than 0.75 (more preferably less than 0.7) and preferably exceeds 0.25 (more preferably exceeding 0.3). Where the internal length of the downstream outlet portion is $l_3$, $l_3/d_2$ is at least 22 and may be as large as desired, such as at least 50. For space reasons it may be desired to curve the second portion gently, and a radius of curvature of the order of 30 $d_3$ is possible. Gentle curvature of the cyclone axis is also feasible. $d_1/d_2$ may be from 1.5 to 3. Preferably $d_0/d_2$ is at most 0.15 and preferably at least 0.,008, for example from 0.01 to 0.1. Pressure drop in the axial overflow outlet should not be excessive, and therefore the length of the "$d_0$" portion of the axial overflow outlet should be kept low. The axial overflow outlet may reach its "$d_0$" diameter instantaneously or by any form of abrupt or smooth transition, and may widen thereafter by a taper or step. The axial distance from the inlet plane to the "$d_0$" point is preferably less than $4d_2$. The actual magnitude of $d_2$ is a matter of choice for operating and engineering convenience and may for example be 10 to 100 mm.

According to the invention, at least part of the generator of the inlet portion or of the primary portion of both may be curved.

The generator may be, for example, (i) a monotonic curve (having no points of inflexion) steepest at the inlet-portion end and tending to a cone-angle of zero at its open end, or (ii) a curve with one or more points of inflexion but overall converging towards the downstream outlet portion, preferably never diverging towards the downstream outlet portion.

A curved generator may be for example of an exponential or cubic form in which case it perferably conforms to the formula $$(mm) = 6 + 22e^{(-Z^{\frac{1}{2}}/20)} \quad \text{(exponential); or}$$

$$(mm) = 28 - [z(2z^2 \times 10^{-6} + 5)]^{\frac{1}{3}} \text{ (cubic).}$$

The invention extends to a method of removing a lighter phase from a larger volume of denser phase, comprising applying the phases to the feed of a cyclone separator as set forth above, the phases being at a higher pressure than in the axial overflow outlet and in the downstream end of the downstream outlet portion; in practice, it will generally be found that the pressure out of the downstream outlet portion will exceed that out of the axial overflow outlet.

This method is particularly envisaged for removing up to 1 part by volume of oil (light phase) from over 19 parts of water (denser phase), such as oil-field production water or sea water which may have become contaminated with oil, as a result of a spillage, shipwreck, oil-rig blow out or routine operations such as bilgerinsing or oil-rig drilling. The ratio of flow rates: upstream outlet/downstream outlet (and hence the split ratio) has a minimum value for successful separation of the oil, which value is determined by the geometry of the cyclone (especially by the value of $d_0/d_2$ but preferably the cyclone is operated above this minimum value, e.g. by back pressure for example provided by valving or flow restriction outside the defined cyclone. Thus preferably the method comprises arranging the split ratio to exceed $1\frac{1}{2}\ (d_0/d_2)^2$ preferably to exceed $2\ (d_0/d_2)^2$.

The method further comprises, as a preliminary step, reducing the amount of free gas in the feed such that in the feed to the inlet the volume of any gas is preferably not more than 20%.

The larger the ratio of $d_0/d_2$ the higher can be the content of gas in the mixture to be separated.

As liquids normally become less viscous when warm, water for example being approximately half as viscous at 50° C. as at 20° C., the method is advantageously performed at as high a temperature as convenient. The invention extends to the products of the method (such as concentrated oil, or cleaned water).

The invention will now be described by way of example with reference to the accompanying drawing which shows, schematically, a cyclone separator according to the invention. The drawing is not to scale.

A generally cylindrical inlet portion 1 has two identical symmetrically circumferentially-spaced groups of feeds 8 (only one group shown) which are directed tangentially both in the same sense, into the inlet portion 1, and are slightly displaced axially from a wall 11 forming the 'left-hand' end as drawn, although subject to their forming an axisymmetric flow, their disposition and configuration are not critical. Coaxial with the inlet portion 1, and adjacent to it, is a primary portion 2, which opens at its far end into a coaxial generally cylindrical third portion 3. The third portion 3 opens into collection ducting 4. The feeds may be slightly angled towards the primary portion 2 to impart an axial component of velocity, for example by 5° from the normal to the axis.

The inlet portion 1 has an axial overflow outlet 10 opposite the primary portion 2.

In the present cyclone separator, the actual relationships are as follows:

$d_1/d_2=2$. This is a compromise between energy-saving and space-saving considerations, which on their own would lead to ratios of around 3 and 1.5 respectively.

Taper half-angle=38′ ($T_2$ on Figure). $d_3/d_2=0.5$ $l_1/d_1=1.0$. Values of from 0.5 to 4 work well $l_2/d_2$ is about 22. The primary portion 2 should not be too long.

The drawing shows part of the primary portion 2 as cylindrical, for illustration. In our actual example, it tapers over its entire length.

In accordance with this invention $l_3/d_2$, is at least 22 and preferably in the range 22 to 50 such as about 30, for best results.

$d_0/d_2=0.04$. If this ratio is too large excessive denser phase may overflow with the lighter phase through the axial overflow outlet 10, which is undesirable. If the ratio is too small, minor constituents (such as specks of grease, or bubbles of air released from solution by the reduced pressure in the vortex) can block the overflow outlet 10 and hence cause fragments of the lighter phase to pass out of the 'wrong' end, at collection ducting 4. With these exemplary dimensions, about 1% by volume (could go down to 0.4%) of the material treated in the cyclone separator overflows through the axial overflow outlet 10. (cyclones having $d_0/d_2$ of 0.02 and 0.06 have also been tested successfully).

$$\frac{\pi d_2 d_i}{4A_i} = 8$$

$d_2=38$ mm. This is regarded as the 'cyclone diameter' and for many purposes can be anywhere within the range 10–100 mm for example 15–60 mm; with excessively large $d_2$, the energy consumption becomes very large while with too small $d_2$ unfavourable Reynolds Number effects and excessive shear stresses arise. Cyclones having $d_2=38$ mm proved very serviceable.

The cyclone separator can be operated in any orientation with insignificant effect.

The wall 11 is smooth as, in general, irregularities upset the desired flow, patterns within the cyclone. For best performance, all other internal surfaces of the cyclone should also be smooth. However, in the wall 11, a small upstanding circular ridge concentric with the outlet 10 may be provided to assist the flow moving radially inward near the wall, and the outer 'fringe' of the vortex, to recirculate in a generally downstream direction for resorting. The outlet 10 is a cylindrical bore as shown. Where it is replaced by an orifice plate lying flush on the wall 11 and containing a central hole of diameter $d_0$ leading directly to a relatively large bore, the different flow characteristics appear to have a slightly detrimental though not serious, effect on performance. The outlet 10 may advantageously be divergent in the direction of overflow, with the outlet orifice in the wall 11 having the diameter $d_0$ and the outlet widening thereafter at a cone half-angle of up to 10°. In this way, a smaller pressure drop is experiencing along the outlet, which must be balanced against the tendency of the illustrated cylindrical bore (cone half-angle of zero) to encourage coalescence of droplets of the lighter phase according to the requirements of the user.

To separate oil from water (still by way of example), the oil/water mixture is introduced through the feeds at a pressure exceeding that in the ducting 4 or in the axial overflow outlet 10, and at a rate preferably of at least 100 liter/minute. The size, geometry and valving of the pipework leading to the feed 8 are so arranged as to avoid excessive break-up of the droplets (or bubbles) of the lighter phase, for best operation of the cyclone separator. For the same reason (avoidance of droplet break-up), still referring to oil and water, it is preferable for no dispersant to have been added. The feed rate (for best performance) is set at such a level that (feed rate/$d_2^{2.8}$)>6.8 with feed rate in $m^3/s$ and $d_2$ in meters. The mixture spirals within the inlet portion 1 and its angular velocity increases as it enters the portion 2. A flow-smoothing taper $T_1$ of angle to the axis 10° is interposed between the inlet and primary portions and 2. Alternatively worded, 10° is the conicity (half-angle) of the frustrum represented by $T_1$.

The bulk of the oil separates within an axial vortex in the primary portion 2. The spiralling flow of the water plus remaining oil then enters the third portion 3. The remaining oil separates within a continuation of the axial vortex in the third portion 3. The cleaned water leaves through the collection ducting 4 and may be collected for return to the sea, for example, or for further cleaning, for example in a similar or identical cyclone or a bank of cyclones in parallel.

The oil entrained in the vortex moves axially to the axial overflow outlet 10 and may be collected for dumping, storage or further separation, since it will still contain some water. In this case too, the further separation may include a second similar or identical cyclone.

Values $d_0/d_2$ at the lower end of the range are especially advantageous in the case of series operation of the cyclone separators, for example where the 'dense phase' from the first cyclone is treated in a second cyclone. The reduction in the volume of 'light phase' is treated in a third cyclone. The reduction in the volume of 'light phase' at each stage, and hence of the other phase unwantedly carried over with the 'light phase' through the axial overflow outlet 10, is an important advantage, for example in a boat being used to clear an oil spill and having only limited space on board for oil containers; although the top priority is to return impeccably de-oiled seawater to the sea, the vessel's endurance can be maximised if the oil containers are used to contain only oil and not wasted on containing adventitious sea-water.

An experimental separator constructed in accordance with this invention had the following dimensions:

$d_1$: 76 mm
$d_2$: 38 mm
$l_1$: 76 mm
$T_1$ (the half angle or taper of the portion of the separator between the inlet and primary portions): 10°
$l_2$: 850 mm
$T_2$ (the half angle or taper angle of the primary portion): 38°
$d_3$: 19 mm
$l_3$: 1137 mm
The overall length of the separator was 2169 mm
$d_0$: 1.5 mm.

The separator had two tangentially arranged feed inlets each of diameter such that $$\frac{\pi d_1 d_2}{4A_i} = 8$$

Figure 2:
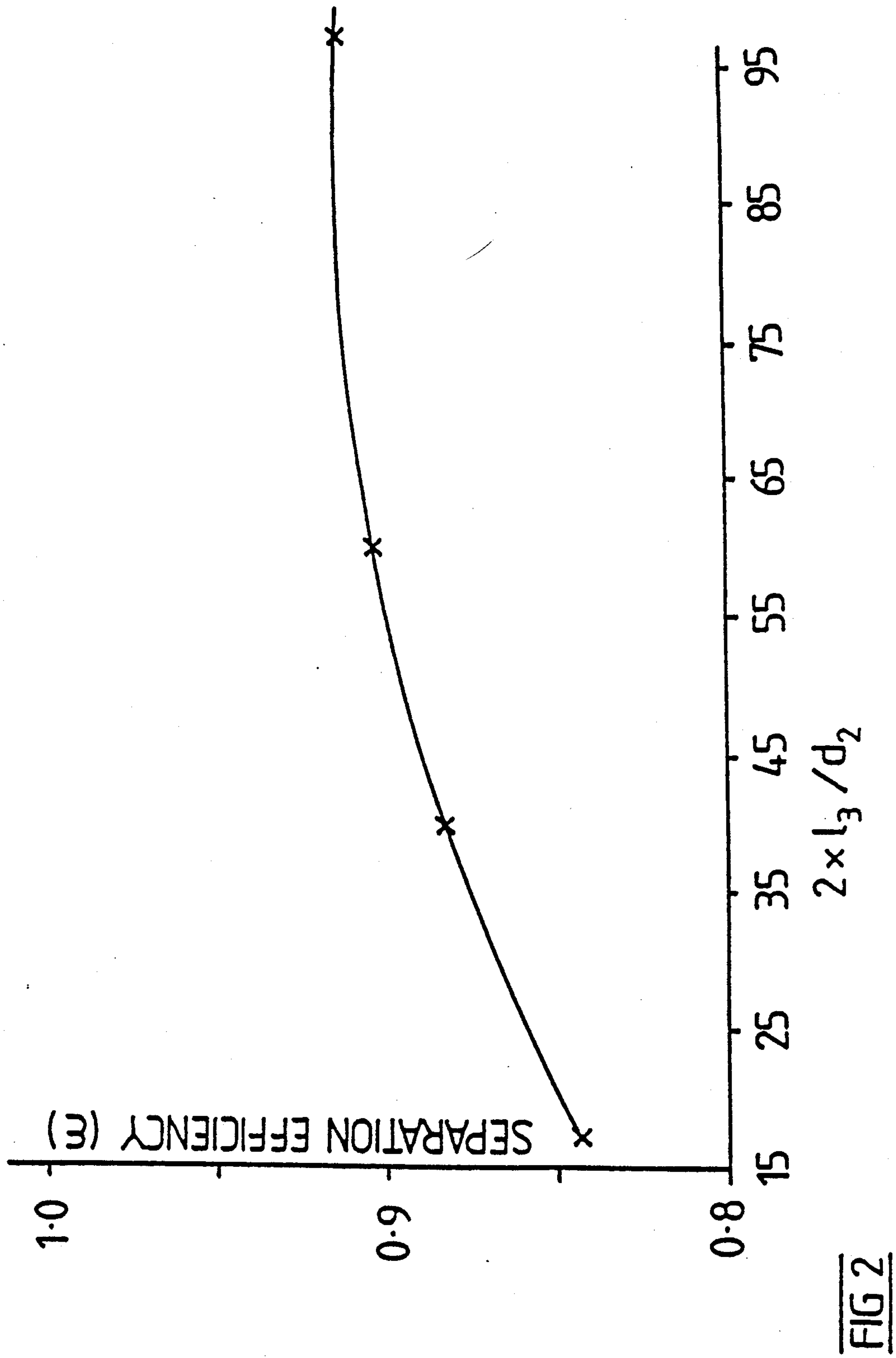

The separation efficiency obtained using a separator constructed in accordance with the invention was compared with the efficiency of two separators in which the length $l_3$ was 340 mm and 740 mm respectively i.e. $l_3/d_2$ is approximately 9 and, 19.5 respectively, and also with a further separator in which $l_3/d_2$ was approximately 50. The results obtained are given in FIG. 2 of the drawings which is a graph showing efficiency of separation ($\epsilon$) against the ratio $l_3/d_2$. The tests were carried out using degassed crude oil from the Forties Oil Field with an inlet drop size of 35$\mu$. The oil concentration in the inlet feed lay between 100 and 710 ppm and the feed rate was 100 liters per minute. The separator was operated at split ratios between 0.2 and 1.7%. The oil concentration in the down stream outlet was reduced to below 75 ppm.

The graph shows that separation efficiency increases with increasing $l_3/d_2$ until a plateau region is reached when that ratio becomes about 30 after which little variation in efficiency is obtained. The amount of oil reaching the down stream outlet is reduced by as much as 22% compared with the separator in which the ratio $l_3/d_2$ is 19.5.

I claim:

1. A cyclone separator comprising at least a primary portion having generally the form of a volume of revolution and having a first end and a second end, the diameter at said second end being less than at said first end, at least one inlet, the or each said inlet having at least a tangential component at or adjacent said first end for introducing feed to be separated into cyclone separator and the separator further including at least two outlets, one at each end of the primary portion in which cyclone separator the following relationships apply:

where $d_1$ is the diameter of the said primary portion where flow enters, preferably in an inlet portion at said first end of said primary portion, (but neglecting any feed channel) $d_{ix}$ is twice the radius at which flow enters the cyclone through the $x^{th}$ inlet (i.e. twice the minimum distance of the tangential component of the inlet centre line from the axis) and $$d_i = \frac{1}{A_i} \sum_{x=1}^{x=n} d_{ix} A_{ix}$$

where $A_{ix}$ is the projection of the cross sectional area of $x^{th}$ inlet measured at entry to the cyclone separator in a plane parallel to the axis of the cyclone separator which is normal to the plane, also parallel to the cyclone axis which contains the tangential component of the inlet centre line, and where $$A_i = \sum_{x=1}^{x=n} A_{ix}$$

and where $d_2$ is the diameter of the primary portion measured at a point $z_2$ where the condition first applies that $$\tan^{-1} \frac{d_2 - d}{2(z - z_2)} < 2^o$$

for all $z > z_2$ where z is the distance along the cyclone separator axis downstream of the plane containing the inlet and d is the diameter of the cyclone at z, and further $z=0$ being the axial position of the weighted areas of the inlets such that the injection of angular momentum into the cyclone separator is equally distributed axially about said axial position where $z=0$ and being defined by $$\frac{1}{A_i d_i} \sum_{x=1}^{x=n} z_x A_{ix} d_{ix} = 0$$

where $z_x$ is the axial position of the $x^{th}$ inlet and wherein the second end of the primary portion feeds into a second portion of constant diameter $d_3$ and length $l_3$ and the following further relationships apply:

$$3 < \pi \frac{d_2 d_i}{4A_i} < 20 \quad \text{(i)}$$

$$20' < \alpha < 2^o \quad \text{(ii)}$$

where $\alpha$ is the half angle of the convergence of the separation portion i.e.

$$\alpha = \tan^{-1} \frac{d_2 - d_3}{2(z_3 - z_2)},$$

where $d_3$ is the diameter of the second end of the primary portion, at position $z_3$ $$d_o/d_2 < 0.2, \text{ where } d_o \text{ is} \quad \text{(iii)}$$

the diameter of the outlet at the first end of the primary portion $$0.9d_1 > d_2 \text{(iv)}$$

$$0.9d_2 > d_3 \quad \text{(v)}$$

$$l_3/d_2 > 22 \quad \text{(vi)}$$

2. A cyclone separator according to claim 1 wherein $l_3/d_2$ is from 22 to 30.

3. A cyclone separator according to claim 1 wherein the inlet or inlets are directed tangentially or have an inwardly spiralling feed channel.

4. A cyclone separator according to claim 3 having its inlets directed tangentially and having at least two equally circumferentially spaced inlets.

5. A cyclone separator according to claim 1 wherein the half angle of convergence averaged over the whole length of the primary portion is between 20' and 2°.

6. A cyclone separator according to claim 5 wherein the half angle of convergence is less than 52' and at least 30'.

7. A cyclone separator according to claim 1 wherein the swirl coefficient S is from 4 to 12.

8. A cyclone separator according to claim 7 wherein the swirl coefficient S is from 6 to 10.

9. A cyclone separator according to claim 2 wherein the separator includes an inlet portion of length $l_1$ and $l_1/d_2$ is from 0.5 to 5.

10. A cyclone separator according to claim 1 wherein $d_3/d_2$ is less than 0.75 and exceeds 0.25.

11. A cyclone separator according to claim 1 wherein $l_3/d_2$ is from 30 to 50.

12. A cyclone separator according to claim 1 wherein $d_1/d_2$ is from 1.5 to 3.

13. A cyclone separator according to claim 1 wherein $d_0/d_2$ is at most 0.15.

14. A cyclone separator according to claim 13 wherein $d_0/d_2$ is from 0.01 to 0.1.

15. A cyclone separator according to claim 1 wherein the axis of the second portion is curved.

16. A cyclone separator according to claim 1 wherein at least a part of the generator of the primary portion is curved.

17. A cyclone separator according to claim 1 wherein the axis of the cyclone is curved.

* * * * *